United States Patent
Yoon et al.

(10) Patent No.: US 6,339,934 B1
(45) Date of Patent: Jan. 22, 2002

(54) MOUNTING APPARATUS FOR VEHICULAR ROOFTOP AIR CONDITIONER

(75) Inventors: Kyung-Hwan Yoon, Seoul; Jang-Jai Lee; Young-Kill Ahn, both of Kwangju, all of (KR)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 09/547,257

(22) Filed: Apr. 11, 2000

(51) Int. Cl.⁷ .................................................. B60H 1/32
(52) U.S. Cl. .................................... 62/244; 62/DIG. 16
(58) Field of Search ........................... 62/244, DIG. 16, 62/239; 454/136

(56) References Cited

U.S. PATENT DOCUMENTS

| | | | |
|---|---|---|---|
| 4,043,143 A | * 8/1977 | Fulder et al. ............... | 62/244 |
| 4,193,339 A | * 3/1980 | Giles ......................... | 454/136 |
| 4,641,502 A | * 2/1987 | Aldrich et al. ............. | 62/DIG. 16 |
| 4,672,818 A | * 6/1987 | Rothyh ...................... | 62/244 |
| 5,342,238 A | * 8/1994 | Segerpalm et al. .......... | 454/136 |
| 5,588,301 A | * 12/1996 | Deroche, Sr. ............... | 62/DIG. 16 |
| 5,791,156 A | * 8/1998 | Strautman et al. .......... | 62/DIG. 16 |

* cited by examiner

Primary Examiner—William E. Tapolcai
(74) Attorney, Agent, or Firm—Wall, Marjama & Bilinski, LLP

(57) ABSTRACT

Apparatus for mounting an air conditioning unit upon the roof of a vehicle for providing conditional air to the interior of the vehicle. A frame is contained within an opening formed in the roof and the unit is mounted upon the frame so that the supply air opening and the return air opening of the unit communicate with the interior of the frame. A one-piece floor panel is contained in the frame upon which an adjustable partition is seated which divides the interior of the frame into two separate compartments. The base of the partition is secured to the floor panel and a movable top section is closed against the pan of the unit so that the supply air can move through one compartment and return air through the other compartment. The top section of the partition is adjustable and is furnished with thick resilient seals so that the mounting frame can be utilized in vehicles having different roof depths.

7 Claims, 4 Drawing Sheets

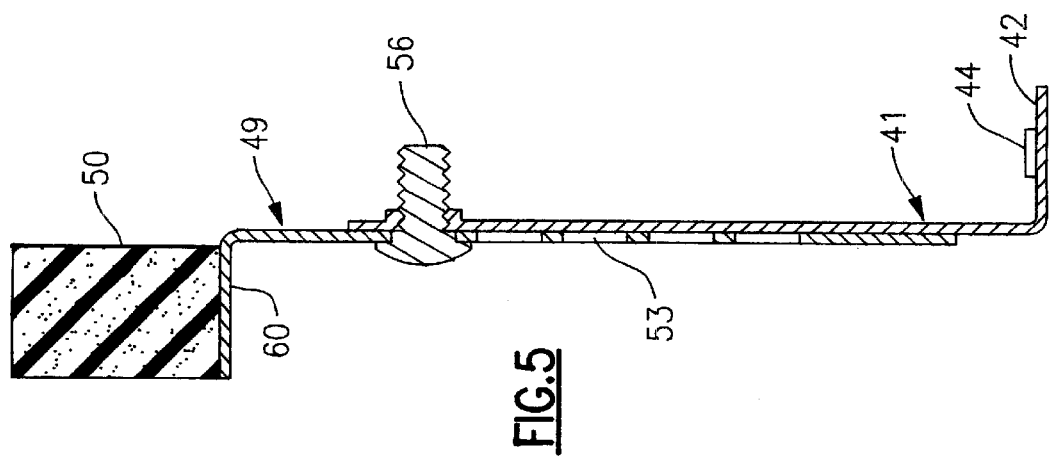
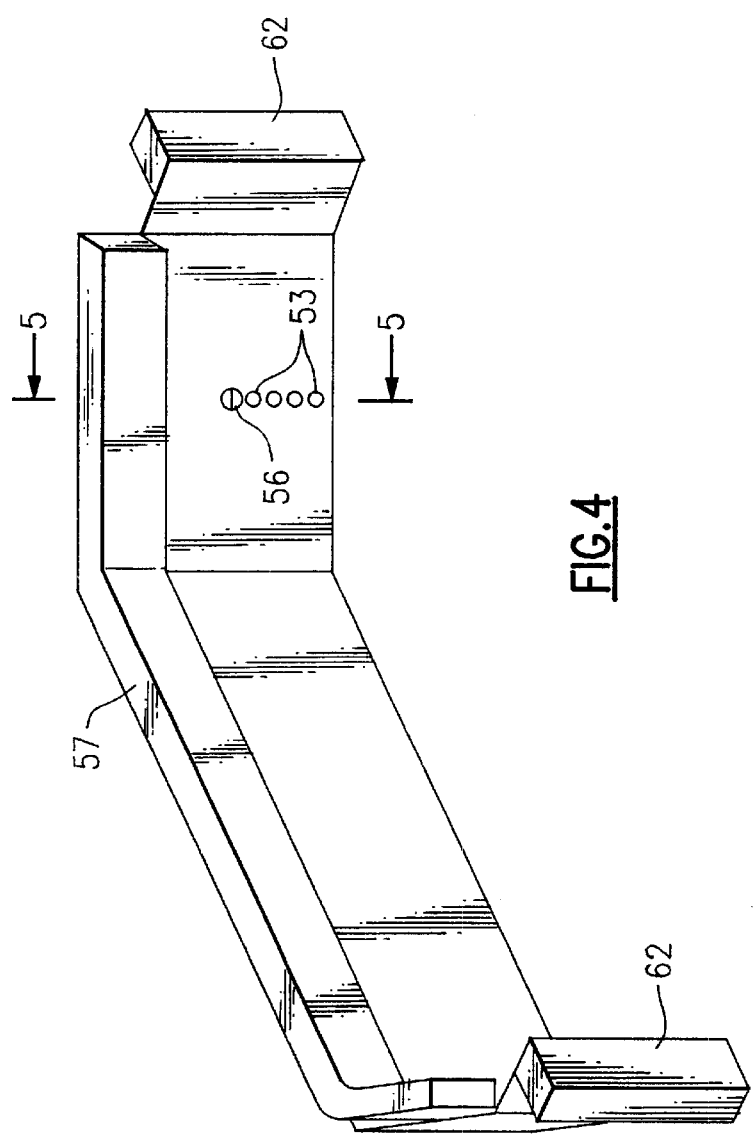

MOUNTING APPARATUS FOR VEHICULAR ROOFTOP AIR CONDITIONER

FIELD OF THE INVENTION

This invention relates generally to air conditioning, and in particular to apparatus for installing an air conditioning unit upon the roof of a vehicle such as a recreational vehicle (R.V.).

BACKGROUND OF THE INVENTION

Roof top air conditioning units known in the prior art have proven to be difficult to install because the roof depth on recreational vehicles and other similar type vehicles can vary from two inches to six inches or more, depending upon the manufacturer. Typically, the air conditioning unit is seated upon a mounting frame that passes downwardly through an opening in the roof into the passenger compartment or comfort zone. The frame typically is divided into two sections, one of which conducts return air from the interior of the vehicle into the air conditioner and the other of which conducts supply air from the air conditioner back to the interior of the vehicle.

Providing a frame that has the desired depth while still separating the supply air and return air flows has been a problem in the art. Typically, the frame assembly includes an undesirable number of interrelated parts that make assembling of the unit time consuming and difficult, thus increasing the cost of the unit. Adjustable panels have been devised for use in the frame for separating the return air path from the supply air path, however, for the most part, these separators have limited adjustability and are unable to provide a tight seal between the two flow paths. As a consequence, the efficiency of the air conditioning unit is adversely effected.

SUMMARY OF THE INVENTION

It is therefore an object of the present invention to improve air conditioning units and in particular, air conditioning units that are mounted upon the roofs of vehicles such as recreational vehicles.

A further object of the present invention is to improve apparatus for mounting an air conditioning unit upon the roof of a motor vehicle.

A still further object of the present invention is to reduce the number of parts needed to install an air conditioning unit upon the roof of a vehicle.

Yet another object of the present invention is to provide a telescoping leak tight fill adjustable partition for separating the supply air and return air flow path in the mounting frame of an automotive roof top air conditioning unit.

These and other objects of the present invention are attained by apparatus for installing an air conditioning unit upon the roof of a vehicle. The apparatus includes a mounting frame that passes downward through the roof of a vehicle upon which the air conditioning unit is seated. A one-piece floor panel is mounted in the frame and an adjustable partition divides the interior of the frame into two compartments and the base of the partition is secured to the floor panel. A movable top section is slidably mounted upon the base section of the partition that is arranged to close against the pan of the air conditioning unit. The height to which the top section of the partition can be brought is adjustable and the resilient seals surround the section to provide positive seals acting against the side walls of the frame and the pan of the air conditioning unit between the return air inlet and the supply air outlet thereby dividing the frame into two separate compartments. Each compartment communicates with the interior of the vehicle so that return air is drawn upwardly into the air conditioning unit through one compartment and supply air is passed downwardly through the second compartment.

BRIEF DESCRIPTION OF THE DRAWING

For a better understanding of these and other objects of the present invention, reference will be made to the following detailed description of a preferred embodiment of the invention, read in connection with the accompanying drawings, in which:

FIG. 4 is an enlarged perspective view showing the telescoping top section of the adjustable partition in greater detail; and FIG. 5 is a further enlarged sectional view of the adjustable partition that is taken along lines 5—5 in FIG. 4.

DETAILED DESCRIPTION OF THE INVENTION

Figure 1:
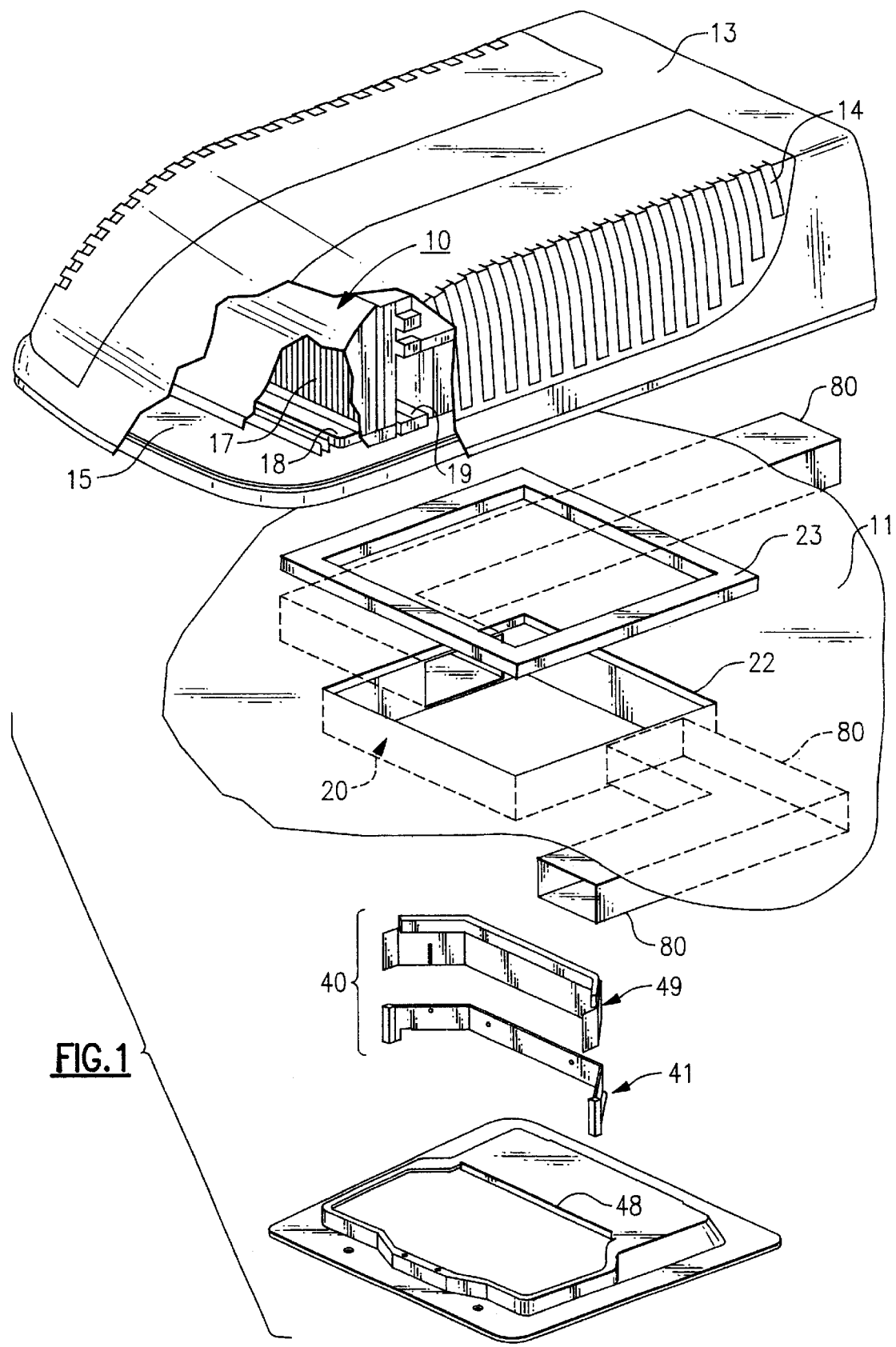
FIG. 1 is an exploded view in perspective showing the mounting apparatus embodying the teachings of the present invention.

Referring initially to FIG. 1, there is illustrated an air conditioning unit, generally referenced 10, that has a low profile and is ideally suited for mounting upon the roof 11 of a motor vehicle such as a recreational vehicle or the like. The air conditioning unit is enclosed within a cabinet 13 that is adapted to seat tightly on the pan 15 of the unit. Vent openings 14 are formed in the cabinet to permit ambient air to move freely into and out of the cabinet. The air conditioning unit is secured to the pan and contains a vertically disposed evaporator coil 17. A return air opening 18 is formed in the pan on one side of the evaporator coil and a supply air opening 19 is similarly provided in the pan on the opposite side of the evaporator coil. Although not shown, a blower fan is arranged to draw return air upwardly into the unit and distribute the air evenly over the heat exchanger surfaces of the coil to condition the air. The conditioned air is then directed downwardly through the supply air openings 19 back into the comfort region which, in this case, is the interior of the vehicle.

Figure 2:
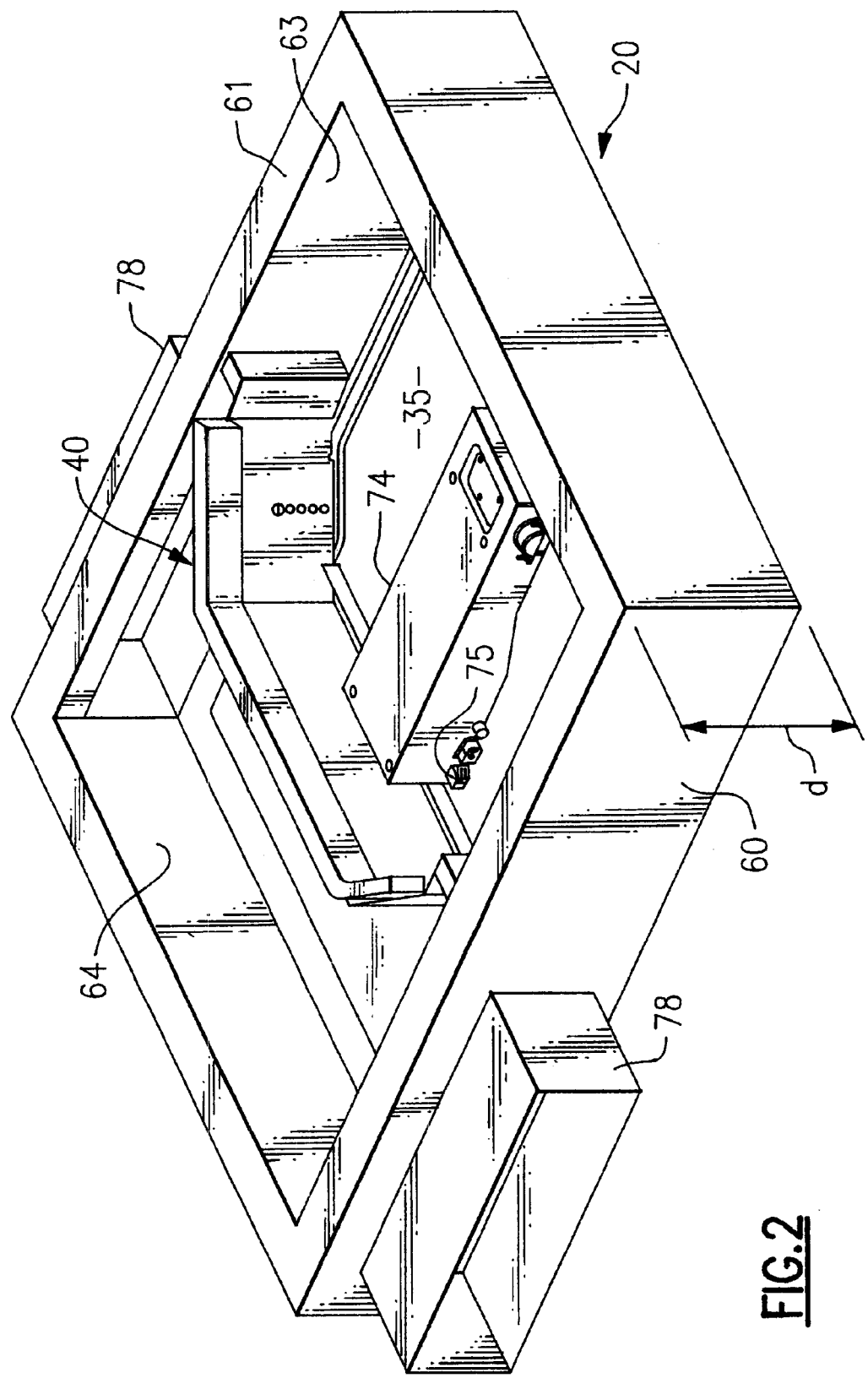
FIG. 2 is an enlarged perspective view showing the mounting frame for the roof top air conditioning unit illustrated in FIG. 1.
Figure 3:
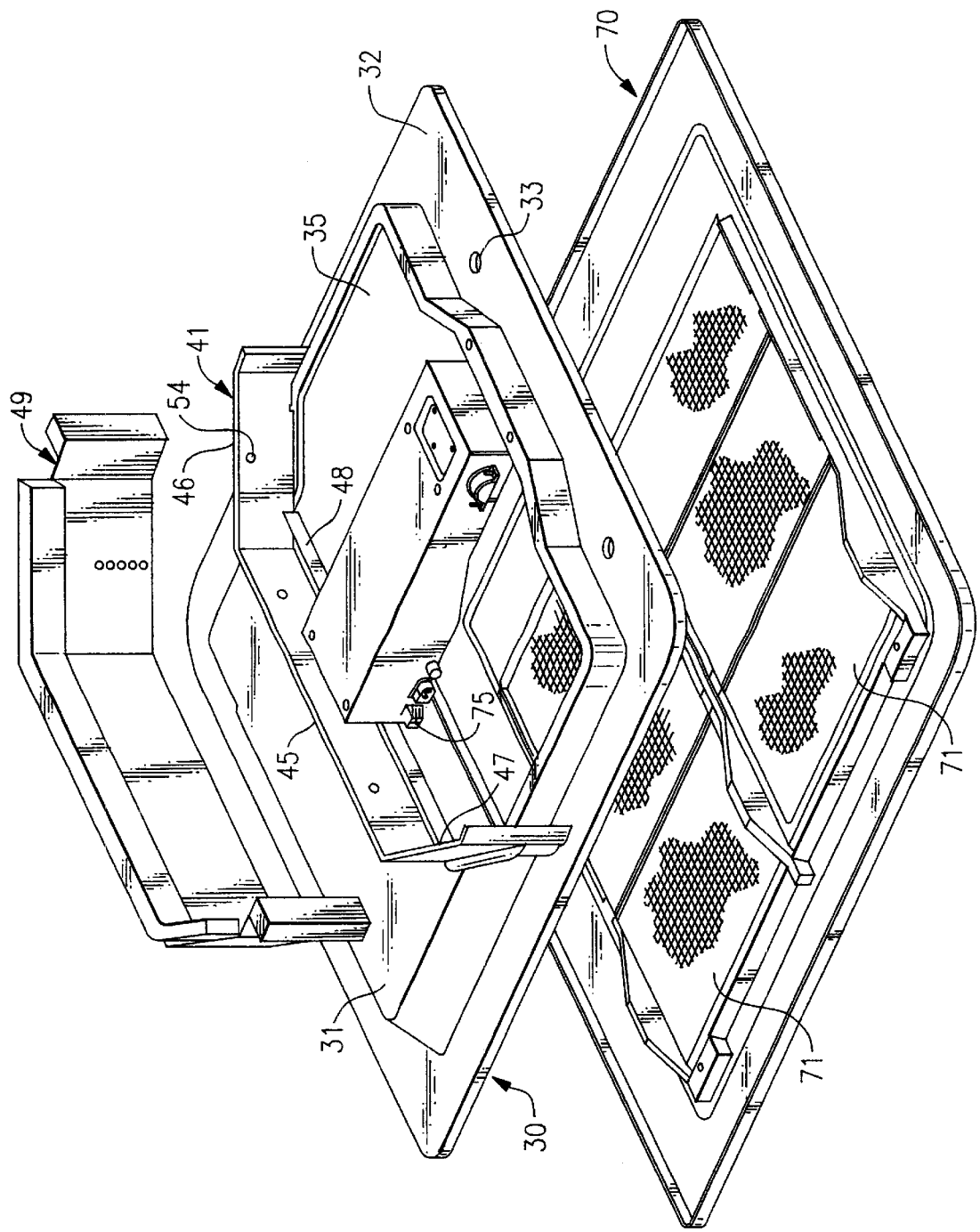
FIG. 3 is a further exploded perspective view showing the floor panel of the frame and the adjustable partition for separating the frame into two compartments, along with a cover assembly which is mounted over the floor panel.

With further reference to FIGS. 2 and 3 there is shown a mounting frame, generally referenced 20, that is arranged to be received within an opening 22 formed in the roof and ceiling of the vehicle. Although not shown, fasteners of any well known construction are provided for securing the frame within the roof opening. The pan of the air conditioning unit is similarly fastened to a roof bracket that is mounted on top of the frame (FIG. 1).

The mounting frame 20 is generally rectangular in form and has a height (d) that permits the frame to pass downwardly beneath the ceiling of the vehicles into the comfort region. A floor panel 30 is secured to the bottom of the frame. The floor panel is a molded one-piece part formed of high strength plastic. The panel includes a raised deck 31 that passes upwardly into the frame in assembly and a peripheral rim 32 that closes against the bottom rim of the frame. The floor panel is secured to the frame by threaded fasteners or the like that are adapted to pass through holes 33 provided in the rim. A floor opening 35 is provided in the raised deck of the panel and, as will be explained in greater detail below, through which return air is drawn into the air conditioning unit.

An adjustable partition 40 is illustrated in FIGS. 3 and 5 which is mounted upon the deck of the floor panel adjacent to the floor opening 35. The partition includes a vertically disposed base 41 having a horizontal flange 42 that is secured to the deck by screws 44 or the like. The base includes an elongated body section 45 that is integral with end sections 46 and 47 that are bent at an angle with regard to the body section so that the base complements the shape of the opening in the floor panel. A raised lip 48 is provided in the floor panel along the rim of the opening against which the base is registered.

A top plate 49 having a shape that complements that of the base is slidably mounted upon the base so that it can be raised or lowered to adjust the height of the partition. The two end sections 50 and 51 of the top plate, each contain a series of vertically aligned holes 53 that can be brought into alignment with a threaded hole provided in the end sections of the base. To adjust the height of the partition, a desired one of the vertically aligned holes 53 located at each end of the top plate is brought into register with the threaded hole 54 in the base and a screw 56 is passed through the top plate and is threaded into the base plate.

A resilient horizontally disposed pad 57 is secured to an upper flange 60 on the adjustable top plate. The pad is arranged to move into deforming contact against the pan of the air conditioning unit between the supply air opening 18 and the return air opening 17 in the pan. The pad 60 has sufficient resiliency so that it can create a positive seal against the pan when the top plate of the partition is brought to a desired height. Resilient vertically disposed end pads 62 are secured to each end of the partition top plate which in assembly, are held in sealing contact against the side walls 60 and 61 of the frame.

As can be seen, the partition divides the interior of the frame into two separate compartments which are a first return air compartment 63 (FIG. 2) and a second supply air compartment 64. The return air compartment is in fluid flow communication with the return air opening 18 in the pan so that the air conditioning unit blower is able to draw return air upwardly through the floor opening 35 in the frame floor panel 30. A filter assembly 70 is mounted over the floor panel of the frame which contains replaceable filter 71 for removing unwanted contaminants from the return air flow passing into the frame. An electrical control box 74 is stored in the return air compartment of the frame that has terminals 75 for connecting the box to various components of the air conditioning unit. Mounting the box within the frame results in a considerable saving of space while not appreciably impeding the flow of return air to a point where it might adversely effect the performance of the roof top unit.

A pair of supply air connectors 78 are mounted in the opposed side walls 60 and 61 of the frame which are in fluid flow communication with the frame supply air compartment. Accordingly, comfort air discharged through the supply air opening 19 in the pan passes through the frame and is distributed into ducts 80 (FIG. 1) coupled to the connector.

Preferably, the resilient sealing pads are formed from a foam plastic material having a high R value so that an effective heat barrier is established between the two compartments within the frame. The cross section of each pad is generally rectangular in form and each pad is about 0.50' thick. Accordingly, the pads provide for a great deal of flexibility in mounting while still providing a tight seal between chambers. The present apparatus contains a minimum of parts, is easy to install, and provides excellent sealing qualities for isolating the supply air flow from the return air flow in a vehicular roof top unit.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. Apparatus for installing an air conditioning unit having a return air inlet and a supply air outlet upon the roof of a vehicle that includes a mounting frame located within an opening in the roof of a vehicle whereby the frame extends into the comfort region of said vehicle, means for supporting an air conditioning unit upon the top of said frame so that the return air inlet and supply air outlet are in fluid flow communication with the interior of said frame, a floor panel enclosing said bottom of said frame, a partition extending across the width of said frame for dividing the frame into a return air compartment that communicates with the return air inlet of said air conditioning unit and a supply air compartment that communicates with the supply air outlet of said air conditioning unit, said partition further including a stationary base that is mounted in an upright position upon said floor panel and which extends between two side walls of said frame, and a movable top plate slidably retained upon said base for movement in a vertical direction, said top plate being arranged to close against said air conditioning unit between the return air inlet and the supply air outlet, said means mounted upon said partition for preventing air from moving across said partition between compartments, and means for placing each frame compartment in further communication with the interior comfort region of said vehicle.

2. The apparatus of claim 1 wherein the floor panel of said frame is a one-piece member molded of a high strength plastic.

3. The apparatus of claim 1 that further includes a pan upon which the air conditioning unit is mounted and in which the return air inlet and the supply air outlets of the unit pass.

4. The apparatus of claim 3 wherein said top plate of the partition contains an upper horizontally disposed flange upon which a first top seal is mounted so that the top seal can be brought into sealing contact with said pan and further including a pair of vertically disposed seals at either end of said partition for sealing against opposed side walls of the frame.

5. The apparatus of claim 1 wherein said movable top plate contains at least one row of vertically aligned holes, a selected one of which can be brought into registration with a tapped hole in said base and a threaded fastener arranged to pass through a selected hole and is threaded into said tapped hole to support the top plate at a desired elevation.

6. The apparatus of claim 5 that further includes a second row of vertically aligned holes, a second selected one of which can be brought into registration with a second tapped hole in said base and a second threaded fastener arranged to pass through said second selected hole and is threaded into said second tapped hole.

7. The apparatus of claim 2 wherein said floor panel contains an opening beneath the return air compartment.

* * * * *